US012666131B2

(12) United States Patent
   Takehara

(10) Patent No.: US 12,666,131 B2
(45) Date of Patent: Jun. 23, 2026

(54) IMAGE PICKUP APPARATUS WITH LINE-OF-SIGHT PROCESSING

(71) Applicant: CANON KABUSHIKI KAISHA, Tokyo (JP)

(72) Inventor: Takumi Takehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 18/410,835

(22) Filed: Jan. 11, 2024

(65) Prior Publication Data
   US 2024/0251155 A1     Jul. 25, 2024

(30) Foreign Application Priority Data

Jan. 20, 2023   (JP) ................................. 2023-007473

(51) Int. Cl.
   *H04N 23/611* (2023.01)
   *G03B 13/02* (2021.01)
   *G06F 3/01* (2006.01)
   *H04N 23/63* (2023.01)
(52) U.S. Cl.
   CPC ........... *H04N 23/611* (2023.01); *G03B 13/02* (2013.01); *G06F 3/013* (2013.01); *H04N 23/635* (2023.01); *G03B 2213/025* (2013.01)
(58) Field of Classification Search
   CPC .. G03B 13/02; G03B 17/18; G03B 2213/025; G06F 3/013; H04N 23/60; H04N 23/611; H04N 23/635
   See application file for complete search history.

(56) References Cited

U.S. PATENT DOCUMENTS

| | | | | | |
|---|---|---|---|---|---|
| 5,734,930 | A | * | 3/1998 | Hagiwara .............. | G03B 13/02 396/296 |
| 12,305,967 | B1 | * | 5/2025 | Yi ........................... | F42B 15/01 |
| 2018/0046842 | A1 | * | 2/2018 | Tomimori .............. | A61B 3/113 |
| 2021/0006723 | A1 | * | 1/2021 | Ichihara ................. | H04N 23/63 |
| 2022/0019789 | A1 | * | 1/2022 | Mori ...................... | G06V 40/18 |
| 2022/0272277 | A1 | * | 8/2022 | Mori .................... | H04N 23/635 |

FOREIGN PATENT DOCUMENTS

JP     2021013057 A     2/2021

* cited by examiner

*Primary Examiner* — Antoinette T Spinks
(74) *Attorney, Agent, or Firm* — Canon U.S.A., Inc. IP Division

(57)     ABSTRACT

An image pickup apparatus includes a detection unit configured to detect proximity of an object to a viewfinder, a line-of-sight detector configured to detect as line-of-sight information, using an eyeball image of a user who peers through the viewfinder, a position that the user gazes at in a display unit disposed inside the viewfinder, and a processor configured to determine whether or not to prohibit the display unit from being set to a non-display state using a feature in the eyeball image, in a case where the line-of-sight information is not detected, and not to set the display unit to the non-display state, in a case where the processor determines that the display unit is prohibited from being set to the non-display state.

5 Claims, 7 Drawing Sheets

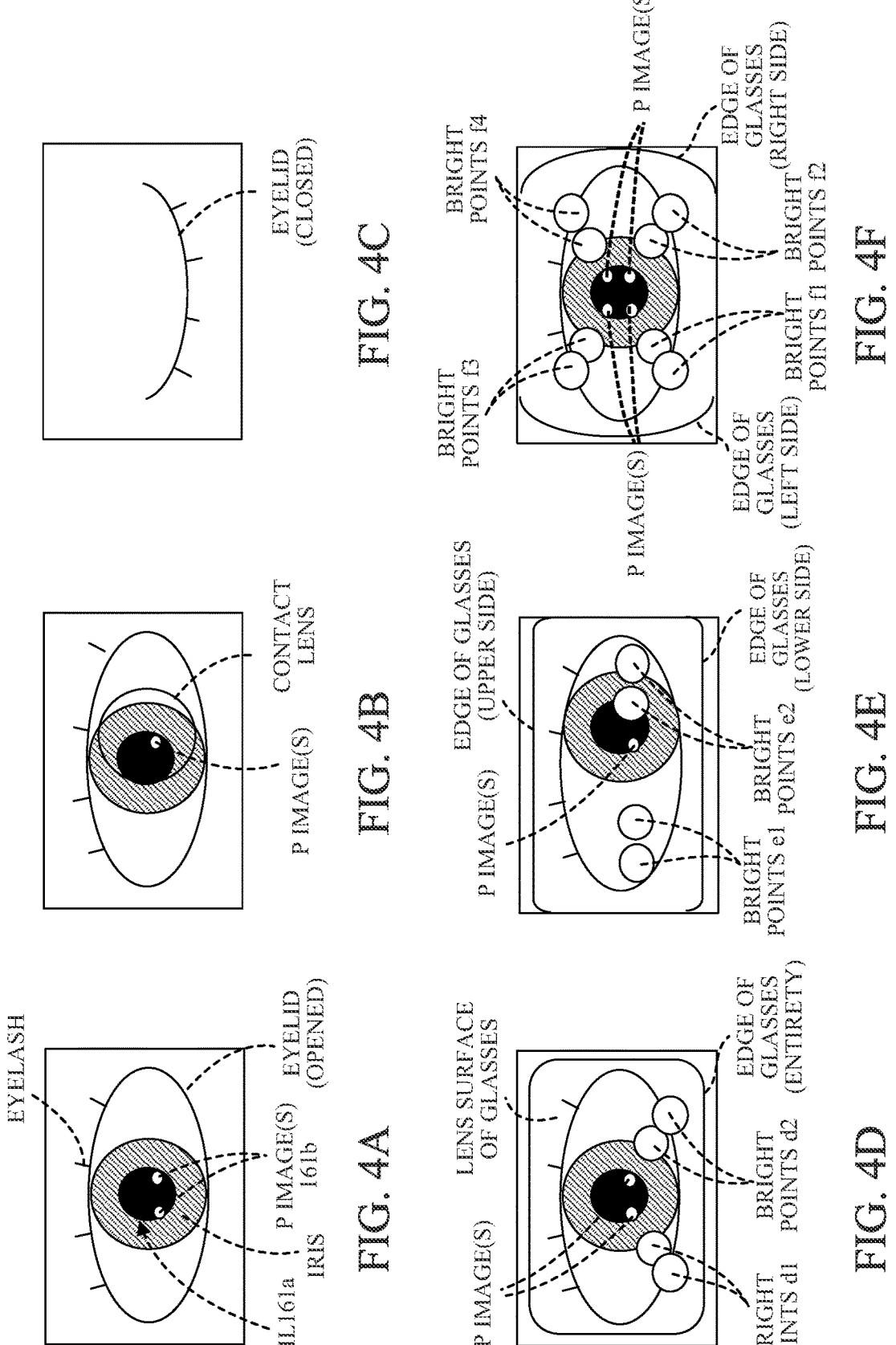

EYELID (CLOSED)

FIG. 4C

CONTACT LENS

P IMAGE(S)

FIG. 4B

EYELASH

EYELID (OPENED)

P IMAGE(S) 161b

PUPIL 161a    IRIS

P IMAGE(S)

FIG. 4A

BRIGHT POINTS f4

P IMAGE(S)

EDGE OF GLASSES (RIGHT SIDE)

BRIGHT POINTS f2

BRIGHT POINTS f1

BRIGHT POINTS f3

EDGE OF GLASSES (LEFT SIDE)

P IMAGE(S)

FIG. 4F

EDGE OF GLASSES (UPPER SIDE)

EDGE OF GLASSES (LOWER SIDE)

BRIGHT POINTS e2

P IMAGE(S)

BRIGHT POINTS e1

FIG. 4E

LENS SURFACE OF GLASSES

EDGE OF GLASSES (ENTIRETY)

BRIGHT POINTS d2

P IMAGE(S)

BRIGHT POINTS d1

FIG. 4D

IMAGE PICKUP APPARATUS WITH LINE-OF-SIGHT PROCESSING

BACKGROUND

Technical Field

The present disclosure generally relates image pickup and, more particularly, to an image pickup apparatus which has a proximity detecting function and a line-of-sight detecting function.

Description of Related Art

A camera including an eyepiece type electronic viewfinder has a proximity detecting function of detecting a proximity of an object to an eyepiece unit of the viewfinder, and a line-of-sight detecting function of detecting a position on a display unit that a user peering through the viewfinder gazes at as line-of-sight information. Japanese Patent Laid-Open No. 2021-13057 discloses, in order to suppress an unnecessary electric power consumption caused by an intra-finder display unit being set to a display state by a proximity of a user's torso to the eyepiece unit, a configuration of setting the display unit to a non-display state, in a case where the proximity of an object is detected and the line-of-sight information is not detected.

The configuration of Japanese Patent Laid-Open No. 2021-13057 may not detect the line-of-sight information in a case where the user is wearing sunglasses, and the like. In such a case, even when the eye of the user wearing sunglasses, and the like, approaches the viewfinder, the display unit may be set to the non-display state.

SUMMARY

An image pickup apparatus according to some embodiments includes a detection unit configured to detect proximity of an object to a viewfinder, a line-of-sight detector configured to detect as line-of-sight information, using an eyeball image of a user who peers through the viewfinder, a position that the user gazes at in a display unit disposed inside the viewfinder, and a processor configured to determine whether or not to prohibit the display unit from being set to a non-display state using a feature in the eyeball image, in a case where the line-of-sight information is not detected, and not to set the display unit to the non-display state, in a case where the processor determines that the display unit is prohibited from being set to the non-display state.

Further features of the disclosure will become apparent from the following description of embodiments with reference to the attached drawings.

BRIEF DESCRIPTION OF THE DRAWINGS

FIGS. 4A to 4J illustrate examples of eyeball images of a person projected with infrared light.

DESCRIPTION OF THE EMBODIMENTS

Figure 1A:
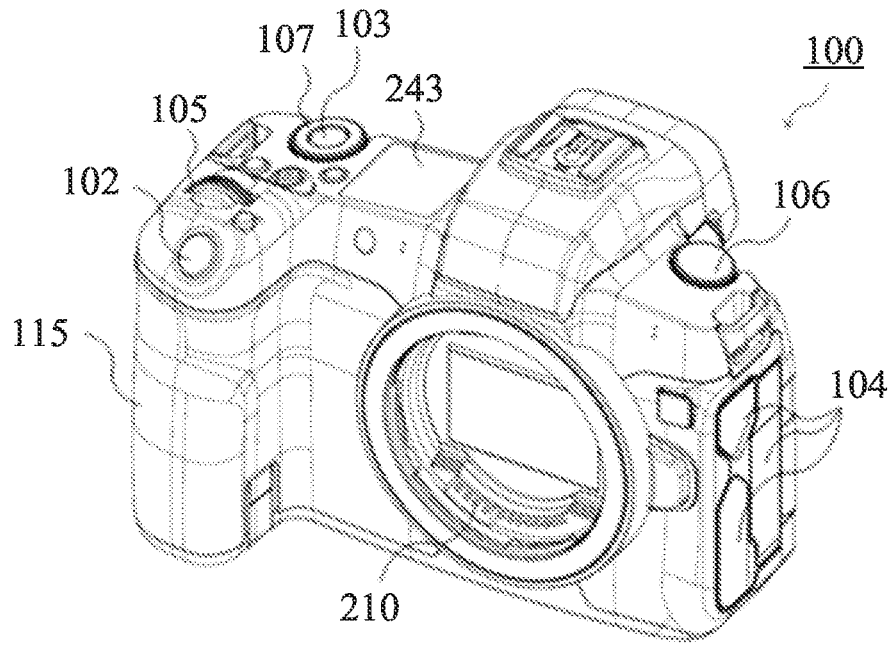
FIGS. 1A and 1B are external views of a digital camera as one example of an image pickup apparatus according to this embodiment.

Various exemplary embodiments, features, and aspects will be described in detail with reference to the attached drawings.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), a specially designed programmable device or controller, circuitry, or combinations thereof. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

Apparatus Configuration

Figure 1B:
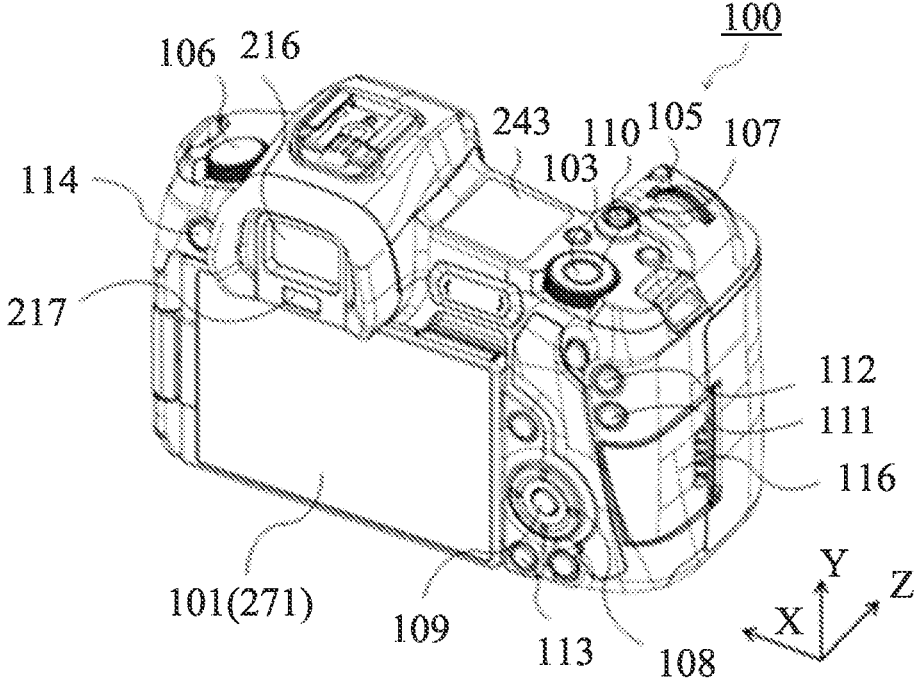
Figure 2:
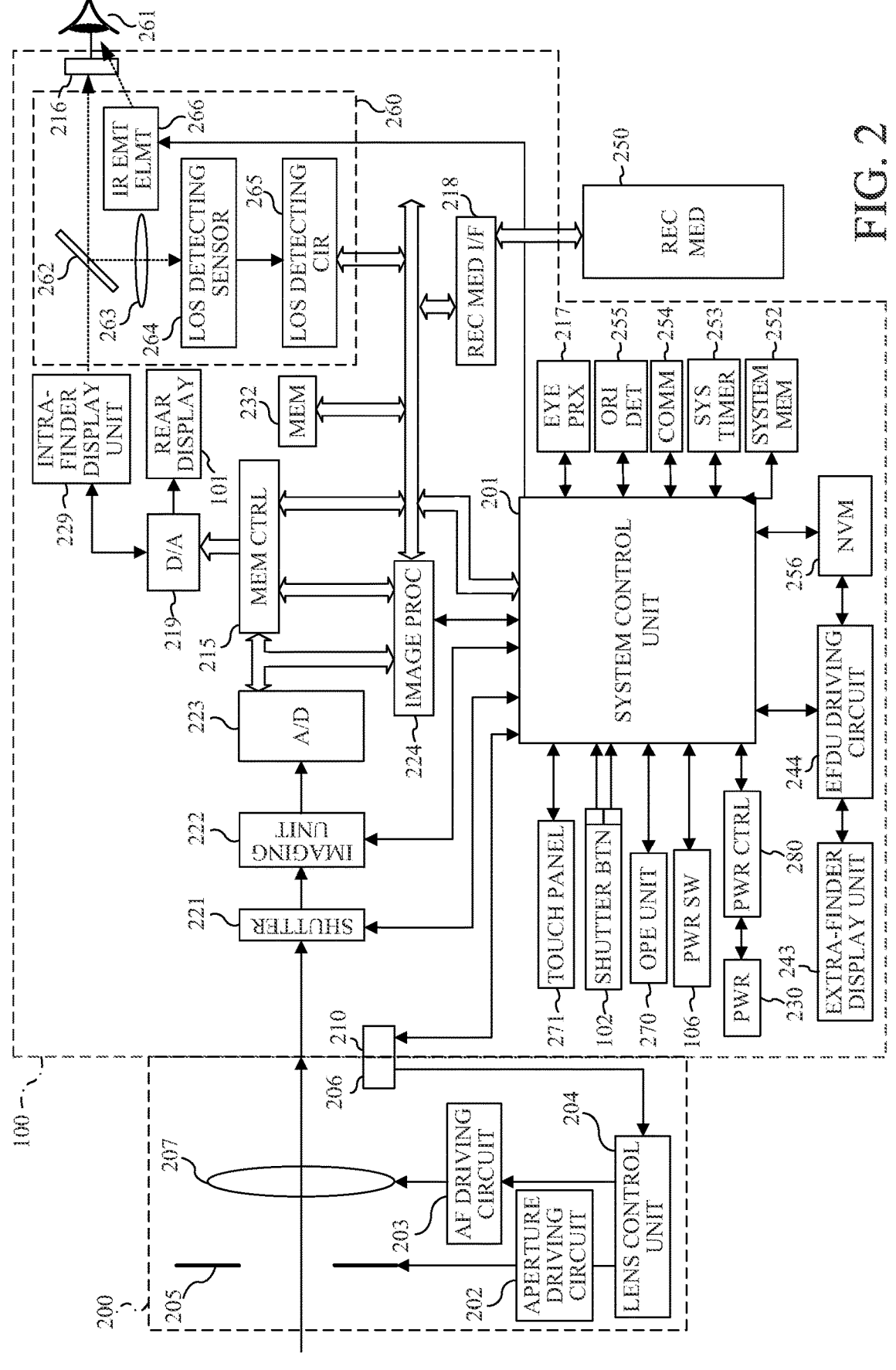
FIG. 2 is a block diagram of a camera system.

FIGS. 1A and 1B are external views of a digital camera 100 as one example of an image pickup apparatus according to an embodiment of the present disclosure. FIG. 1A and FIG. 1B illustrate the digital camera 100 viewed from a front surface side and a rear surface side, respectively. FIG. 2 is a block diagram of a camera system that includes the digital camera 100 and a lens unit 200.

A rear display unit 101 is a display device such as a liquid crystal panel or an organic EL panel, etc., which is provided on the rear surface of a camera body, and displays images or various information so that a user can recognize them. The rear display unit 101 has a function of playing back still images that have been captured, displaying moving images during recording, displaying live-view (LV) images, and the like. A touch panel 271 is provided on the rear display unit 101. The touch panel 271 can detect contact (touch operation) on the display surface of the rear display unit 101 (operation surface of the touch panel 271).

A shutter button (SHUTTER BTN) 102 is a push-button operation member for instructing imaging. A mode switch 103 is a dial type operating member for switching between various modes. The mode switch 103 is used to switch the operation mode of a system control unit 201 to one of a still image capturing mode, a moving image recording mode, and a playback mode. The still image capturing mode includes, for example, an auto imaging mode, an auto scene determining mode, a manual mode, an aperture priority mode (Av mode), a shutter speed priority mode (Tv mode), program auto-exposure (AE) mode (P mode), etc. The still image capturing mode also includes, for example, various scene modes, a program AE mode, a custom mode, etc., which are imaging settings for each imaging scene. The mode switch 103 may be used to directly switch to one of the plurality of modes included in the still image capturing mode. Alternatively, after the mode switch 103 once switches to the still image capturing mode, the mode may be switched to any one of a plurality of modes included in the still image capturing mode using another operating member. Similarly, the moving image recording mode and the playback mode may also include a plurality of modes.

A terminal cover 104 is a cover member that protects a connector (not illustrated) for connecting an external device and the digital camera 100 via a cable such as a USB, and the like. A main electronic dial 105 is a rotary operation member included in an operation unit (OPE) 270. Turning the main electronic dial 105 can change a set value such as shutter speed and an F-number, and the like. A power switch 106 is an operation member that turns on and off the power of the digital camera 100. A sub electronic dial 107 is a rotary operation member that moves a selection frame, feeds images, and the like. A cross key 108 is a movement instruction member that includes four direction buttons consisting of up, down, left, and right, and is operable in accordance with a pressed button. A SET button 109 is a push-button operation member that is mainly used to determine a selection item. A recording button 110 is a push-button operation member that is used to instruct to start or stop moving image capturing (recording). An enlargement button 111 is a push-button operation member that is used to turn on and off enlarged display during live-view and change an enlargement ratio during enlarged display. The enlargement button 111 is also used to enlarge the playback image and increase the enlargement ratio in the playback mode. The live-view image can be enlarged or reduced by operating the main electronic dial 105 after the enlarged display is turned on. An AE lock button 112 is a push-button operation member that can fix the exposure state when pressed in the imaging standby state. A playback button 113 is a push-button operation member that is used to switch between the imaging mode and the playback mode. By pressing the playback button 113 during the imaging mode, the mode shifts to the playback mode, and the latest image among the images recorded on a recording medium 250 can be displayed on the rear display unit 101. A menu button 114 is a push-button operation member that displays a menu screen with various settings on the rear display unit 101 when pressed. The user can intuitively make various settings using the menu screen displayed on the rear display unit 101, the cross key 108, and the SET button 109.

The rear display unit 101 and an intra-finder display unit (display unit) 229 located inside the viewfinder function as an electronic viewfinder (EVF) and their displays are controlled by the system control unit 201 in accordance with the various operation modes described above. An eyepiece unit 216 is a peering type eyepiece viewfinder. The user can visually recognize the image displayed on the intra-finder display unit 229 via the eyepiece unit 216, and can confirm the focus and composition of an object image captured through a lens unit 200. An eye proximity detector (detector/EYE PRX) 217 is disposed near the eyepiece unit 216 and can detect the proximity of an object to the eyepiece unit 216. The eye proximity detector 217 uses, for example, an infrared proximity sensor. A lid 116 is a member that opens and closes a slot in order to attach and detach the recording medium 250 to and from the digital camera 100. A grip portion 115 is shaped so that the user can easily grip it with his right hand in a case where the user holds the digital camera 100. The shutter button 102 and the main electronic dial 105 are disposed at positions operable with the user's index finger of his right hand while the user holds the digital camera 100 by gripping the grip portion 115 with the little finger, ring finger, and middle finger of his right hand. In the same state, the sub electronic dial 107 is disposed at a position that can be operated with the thumb of the right hand.

The lens unit 200 includes an imaging lens 207, and is attachable to and detachable from the digital camera 100. Although the imaging lens 207 normally includes a plurality of lenses, only a single lens is illustrated in FIG. 2 for simplicity. A communication terminal 206 is an electrical contact point through which the lens unit 200 communicates with the digital camera 100. The communication terminal 210 is an electrical contact point through which the digital camera 100 communicates with the lens unit 200. A lens control unit 204 communicates with the system control unit 201 via the communication terminals 206 and 210, controls an aperture driving circuit 202 to move the aperture stop 205, and controls an AF driving circuit 203 to change a position of the imaging lens 207 for focusing.

A focal plane shutter 221 can freely control the exposure time of an imaging unit 222 according to an instruction from the system control unit 201. The imaging unit 222 is an image sensor that is configured by image pickup elements such as a CCD, CMOS, or the like, that converts an object image into an electrical signal. An A/D converter 223 converts a one-pixel analog signal output from the imaging unit 222 into, for example, a 10-bit digital signal. An image processing unit 224 performs predetermined pixel interpolation, resizing processing, and color conversion processing for the data from the A/D converter 223 or the data from a memory control unit 215. The image processing unit 224 performs predetermined calculation processing using the captured image data, and the system control unit 201 performs exposure control and focusing detecting control based on the calculation results. Thereby, through-the-lens (TTL) type autofocus (AF) processing, auto-exposure (AE) processing, and flash pre-emission (EF) processing are performed. The system control unit 201 also performs TTL type auto white balance (AWB) processing based on the calculation results. The memory control unit 215 controls data exchange with the A/D converter 223, the image processing unit 224, and a memory 232. Digital data output from the A/D converter 223 is directly written into the memory 232 via the image processing unit 224 and the memory control unit 215 or via the memory control unit 215.

The memory 232 stores image data acquired from the imaging unit 222 and the A/D converter 223 and image data for display to be displayed on the rear display unit 101 or the intra-finder display unit 229. The memory 232 has a storage capacity sufficient to store a predetermined number of still images, a predetermined period of moving images, and audio. The memory 232 also serves as an image display memory (video memory). A D/A converter 219 converts the image data for display stored in the memory 232 into an analog signal and supplies it to the rear display unit 101 or the intra-finder display unit 229. The image data for display written in the memory 232 is displayed on the rear display unit 101 and the intra-finder display unit 229 via the D/A converter 219. The rear display unit 101 and the intra-finder display unit 229 perform display according to the analog signal from the D/A converter 219. Thus, converting the digital signal stored in the memory 232 into an analog signal and sequentially transferring and displaying it on the rear display unit 101 or the intra-finder display unit 229 can provide live-view display (through image display). An extra-finder display unit 243 is a display device such as a liquid crystal panel or an organic EL panel provided on the top surface of the camera body. Various setting values of the digital camera 100, such as shutter speed, aperture stop, and the like, are displayed on the extra-finder display unit 243 via an extra-finder display unit (EFDU) driving circuit 244.

A nonvolatile memory (NVM) 256 is an EEPROM or the like, and stores constants, programs, etc. for the operation of the system control unit 201. Here, the program is a program for executing a flowchart described below. The system control unit 201 includes a CPU and an MPU that collectively control the entire digital camera 100, and executes programs stored in the nonvolatile memory 256 to realize each processing in the flowchart described below. The system control unit 201 also performs display control by controlling the memory 232, the D/A converter 219, the rear display unit 101, the intra-finder display unit 229, and the like. The system memory 252 is, for example, a RAM or the like, and is used as a work memory for loading constants and variables for the operation of the system control unit 201, programs read from the nonvolatile memory 256, and the like. A system timer 253 measures the time for various controls and the time of a built-in clock.

A first shutter switch 211 and a second shutter switch 212 input the following operation instructions to the system control unit 201. The first shutter switch 211 is turned on in a case where the shutter button 102 is pressed halfway or half-pressed (imaging preparation instruction), and generates a first shutter switch signal SW1. The system control unit 201 receives the first shutter switch signal SW1 and causes the image processing unit 224 to start the AF processing, AE processing, AWB processing, EF processing, etc. The second shutter switch 212 is turned on in a case where the operation of the shutter button 102 is completed or fully pressed (imaging instruction), and generates a second shutter switch signal SW2. The system control unit 201 starts a series of imaging processing from reading out signals from the imaging unit 222 to writing image data to the recording medium 250 in response to the second shutter switch signal SW2.

The operation unit 270 is configured by operation members such as various switches or buttons, etc., that receive various operations from the user and notifies the system control unit 201 of the instruction. The operation members include, for example, the shutter button 102, the mode switch 103, the main electronic dial 105, the power switch 106, and the sub electronic dial 107. The operation members also include the cross key 108, the SET button 109, the recording button 110, the enlargement button 111, the AE lock button 112, the playback button 113, the menu button 114, and the touch panel 271.

A power supply control unit 280 includes a battery detection circuit, a direct current to direct current (DC-DC) converter, a switch circuit for switching the block to be electrified, and the like, and detects whether or not a battery is attached, the type of battery, and the remaining battery level. The power supply control unit 280 controls the DC-DC converter based on the detection result and an instruction from the system control unit 201, and supplies voltage to each unit including the recording medium 250 for a period of time. The power supply unit 230 includes a primary battery such as an alkaline battery or a lithium battery, a secondary battery such as a nickel cadmium (NiCd) battery, a nickel-metal hydride (NiMH) battery, a lithium-ion (Li-ion) battery, or other battery, an alternating current (AC) adapter, and the like. A recording medium I/F 218 is an interface with the recording medium 250. The recording medium 250 is a recording medium such as a memory card for recording captured images, and includes a semiconductor memory, a magnetic disk, or the like.

The communication unit 254 is communicably connected to an external device via a wireless antenna or wired cable, and transmits and receives video and audio. The communication unit 254 can also be connected to a wireless Local Area Network (LAN) and the Internet. The communication unit 254 can transmit image data (including live-view images) captured by the imaging unit 222 and image files recorded on the recording medium 250 to the external device, and can also receive image data and other various information from the external device. The communication unit 254 may use a wireless communication module such as infrared communication, Bluetooth (registered trademark), Bluetooth Low Energy (registered trademark), Wireless universal serial bus (USB), or the like. Alternatively, the communication unit 254 may use a wired connection unit such as an USB cable, high-definition multimedia interface (HDMI) (registered trademark), IEEE1394, or the like. IEEE1394 is a serial bus architecture for high-speed data transfer where IEEE refers to Institute of Electrical and Electronics Engineers.

An orientation detector (ORI DET) 255 detects an orientation of the digital camera 100 relative to the gravity direction. Based on the orientation detected by the orientation detector 255, it can be determined whether the image captured by the imaging unit 222 is an image captured with the digital camera 100 held horizontally or an image captured with the digital camera 100 held vertically. The system control unit 201 can add orientation information according to the orientation detected by the orientation detector 255 to the image file of the image captured by the imaging unit 222, or can rotate and record the image. The orientation detector 255 includes, for example, an acceleration sensor, a gyro sensor, or the like. The orientation detector 255 can also detect movement (panning, tilting, lifting, standing still, etc.) of the digital camera 100 using the acceleration sensor or the gyro sensor.

The touch panel 271 can be integrated with the rear display unit 101. For example, the touch panel 271 is configured so as not to interfere with the display on the rear display unit 101, and is attached to the upper layer of the display surface of the rear display unit 101. The input coordinates on the touch panel 271 are associated with the display coordinates on the rear display unit 101. Thereby, a GUI can be configured as if the user could directly operate the screen displayed on the rear display unit 101. The system control unit 201 can detect the following operations or states on the touch panel 271.

The user's finger or pen, which has not touched the touch panel 271, newly touched the touch panel 271. That is, the start of a touch (referred to as touch-down hereinafter).

The touch panel 271 is being touched with the user's finger or pen (referred to as touch-on hereinafter).

The user's finger or pen is moving while touching the touch panel 271 (referred to as touch-move hereinafter).

The finger or pen that has touched the touch panel 271 is released. That is, the end of the touch (referred to as touch-up hereinafter).

Nothing touches the touch panel 271 (referred to as touch-off hereinafter).

In a case where the touch-down is detected, the touch-on is also detected at the same time. After the touch-down, the touch-on typically continues to be detected unless the touch-up is detected. The touch-move is also detected while the touch-on is detected. Even if the touch-on is detected, if the touch position does not move, the touch-move is not detected. After all touching fingers and pens are detected to have touched up, the touch-off is detected. These operations and states and the position coordinates where the finger or pen is touching on the touch panel 271 are notified to the system control unit 201 through an internal bus. The system control unit 201 determines what kind of operation (touch operation) has been performed on the touch panel 271 based on the notified information. Regarding the touch-move, the moving direction of the user's finger or pen that moves on the touch panel 271 can also be determined for each vertical component and horizontal component on the touch panel 271 based on changes in position coordinates. In a case where the touch-move of a predetermined distance or longer is detected, it is determined that a sliding operation (drag) has been performed. An operation in which the user quickly moves his fingers by a certain distance while the user's finger touches the touch panel, and then releases his finger will be called a flick. In other words, the flick is an operation in which a finger is quickly traced on the touch panel 271 as if it flicks it. In a case where the touch-move of a predetermined distance or longer and at a predetermined speed or higher is detected, and the touch-up is detected as it is, it can be determined that the flick has been performed (it can be determined that the flick has occurred following the drag). A touch operation in which a plurality of points (for example, two points) are touched at the same time and the touch positions are brought closer to each other will be called pinch-in, and a touch operation in which the touch positions are moved away from each other will be called pinch-out. The pinch-out and the pinch-in will be collectively referred to as a pinch operation (or simply pinch).

The touch panel 271 may be any one of various types of touch panels, such as a resistive film type, a capacitive type, a surface acoustic wave type, an infrared type, an electromagnetic induction type, an image recognition type, an optical sensor type, or the like. There are a method that detects a touch using contact with the touch panel, and a method that detects a touch using the proximity of the user's finger or pen to the touch panel, however, either method may be used.

The eye proximity detector 217 detects proximity of an eye (object) (eye proximity) and separation of the eye (object) (eye absence, separation, distance, or non-proximity) to the eyepiece unit 216 (proximity detection). The system control unit 201 performs the display control of the rear display unit 101 and the intra-finder display unit 229 according to the state detected by the eye proximity detector 217. The system control unit 201 sets the display destination to the rear display unit 101 and sets the intra-finder display unit 229 to a non-display state (sets off the display of the intra-finder display unit 229) during the eye absence at least in the imaging mode and in a case where the display destination switching is automatic. The system control unit 201 sets the display destination to the intra-finder display unit 229 and sets the rear display unit 101 to the non-display state during the eye proximity.

In a case where an object approaches, infrared light emitted from a light emitter (not illustrated) of the eye proximity detector 217 is reflected and the reflected light enters a light receiver (not illustrated) of the infrared proximity sensor. Thereby, the proximity of the object to the eyepiece unit 216 can be detected, and the distance of the object from the eyepiece unit 216 (eye proximity distance) can be determined based on an incident infrared light amount received by the light receiver of the infrared proximity sensor. In a case where the proximity of the object to the eyepiece unit 216 is detected, the system control unit 201 can set the intra-finder display unit 229 to the display state. Thereby, in a case where the user peers through the eyepiece unit 216, the intra-finder display unit 229 can be displayed as quickly as possible.

In a case where the eye proximity detector 217 detects an object that approaches the eyepiece unit 216 within a predetermined distance from an eye absence state (non-proximity state), the eye proximity detector 217 determines that the eye proximity is detected, and transmits an eye proximity detection notification to the system control unit 201. In a case where the object whose proximity was detected moves away from the eye proximity state (proximity state) by a predetermined distance or longer, the eye proximity detector 217 determines that the eye absence is detected, and transmits an eye absence detection notification to the system control unit 201. A threshold for detecting eye proximity and a threshold for detecting eye separation may be different by providing hysteresis, for example. After the eye proximity is detected, it is assumed that the eye proximity state is kept until the eye absence is detected. After the eye proximity is detected, it is assumed that the eye proximity state is kept until the eye absence is detected. After the eye absence is detected, it is assumed that the eye absence state is kept until the eye proximity is detected. Thereby, the system control unit 201 controls the display on the rear display unit 101 and the display on the intra-finder display unit 229 according to the eye proximity state or the eye absence state detected by the eye proximity detector 217. The eye proximity detector 217 is not limited to an infrared proximity sensor, and another sensor may be used as long as it can detect the proximity of an object that can be considered as the eye proximity.

A line-of-sight detector 260 includes a dichroic mirror 262, an imaging lens 263, a line-of-sight (LOS) detecting sensor 264, a line-of-sight detecting circuit 265, and an infrared light emitting element (IR EMT ELMT) 266, and detects not only the presence or absence of the user's line of sight but also the position and movement of the line of sight. The infrared light emitting element 266 is a diode that emits infrared light to detect the user's line of sight position within the intra-finder display unit 229 and emits the infrared light so as to enter the user's eyeball (eye) 261 toward near the center of the eyepiece unit 216. After the infrared light emitted from the infrared light emitting element 266 is reflected by the eyeball 261, the reflected infrared light reaches the dichroic mirror 262. The dichroic mirror 262 has a function of reflecting only infrared light and transmitting visible light, and the infrared light whose optical path has been changed by the dichroic mirror 262 is imaged on an imaging surface of the line-of-sight detecting sensor 264 via the imaging lens 263. The imaging lens 263 is an optical element that constitutes a line-of-sight detecting optical system. The line-of-sight detecting sensor 264 includes an image sensor such as a CCD, CMOS, or the like, and photoelectrically converts incident infrared light into an electrical signal and outputs it to the line-of-sight detecting circuit 265. The line-of-sight detecting circuit 265 detects the user's line-of-sight position from the movement of the user's eyeball (eye) 261 and the pupil position based on the output signal of the line-of-sight detecting sensor 264, and outputs the detected information to the system control unit 201. The line-of-sight detecting circuit 265 can detect the pupil of a person's eye, and thus does not detect that a person's line of sight is being input even if another object approaches or contacts the eyepiece unit 216. Thereby, the eyepiece unit 216 has a function as a line-of-sight operation unit, however, the line-of-sight detector may have a different configuration. The line-of-sight detector 260 can detect the following information in the eye proximity state in the eyepiece unit 216.

Detection state of at least one of an edge of a pupil 161_a_ and corneal reflection images (Purkinje images=P images) 161_b_ input to the eyepiece unit 216

Distance between P images 161_b_ input to the eyepiece unit 216

These pieces of information are notified to the system control unit 201 through the internal bus. The output signal of the line-of-sight detecting sensor 264 is transmitted to the system control unit 201, and a characteristic area such as an area having a shape of a person's eye, a radial bright spot area, an area of an edge of glasses or sunglasses, and the like, is extracted by an analysis. The user can set the enablement and disablement of the line-of-sight input function by the line-of-sight detector 260, for example, via the menu screen.

Control Processing

Figure 3A:
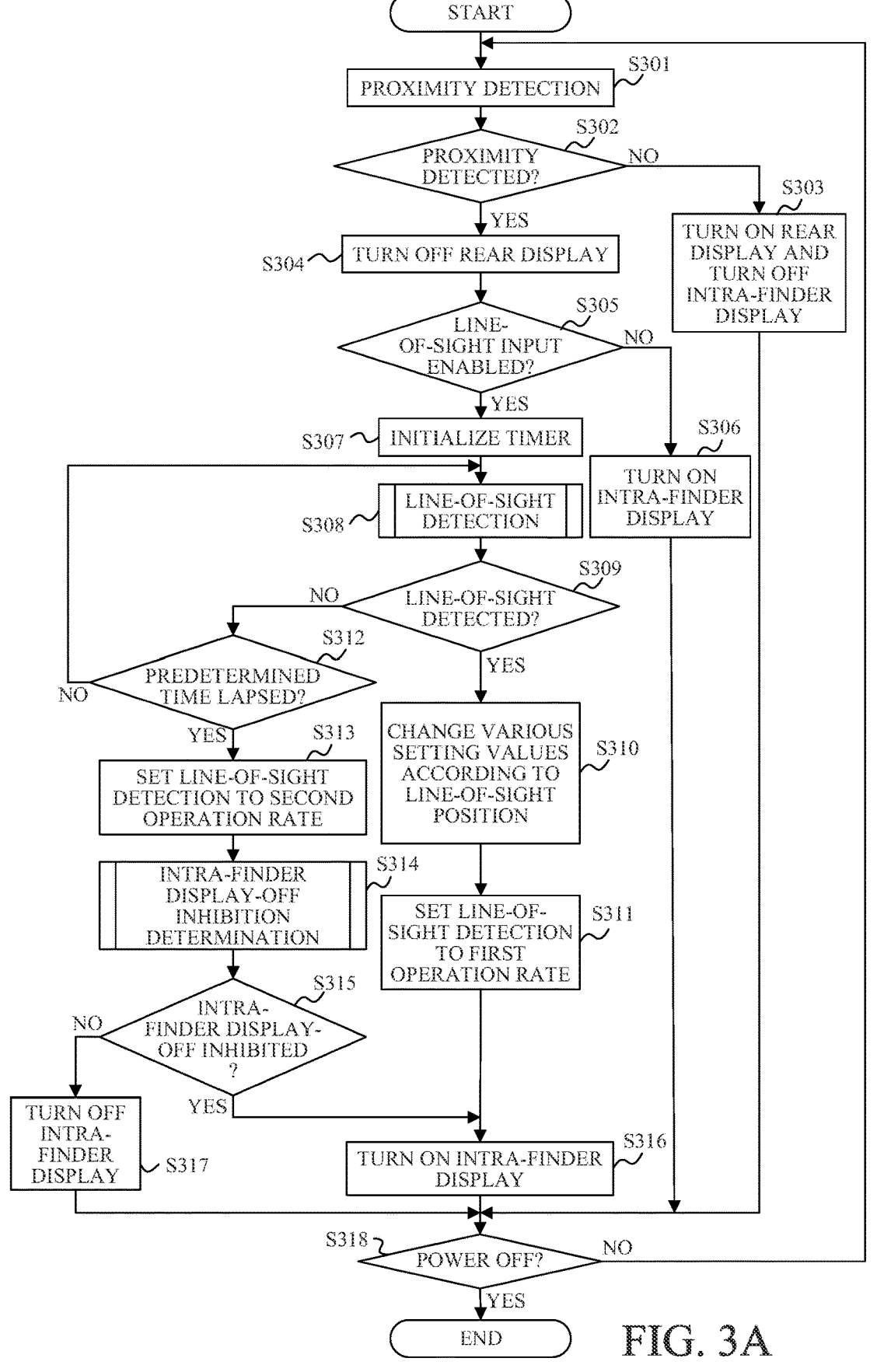
FIGS. 3A and 3B are flowcharts illustrating a display control of a rear display unit and an intra-finder display unit.
Figure 3B:
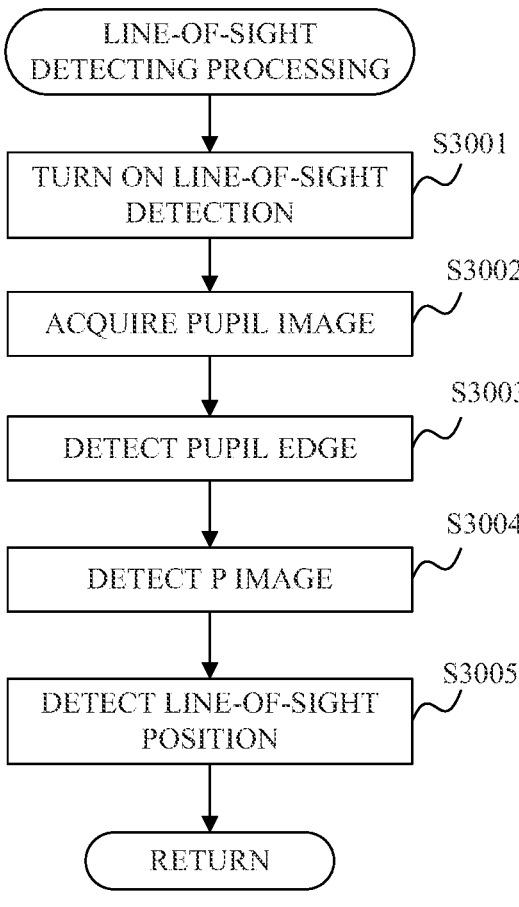

FIGS. 3A and 3B are flowcharts illustrating a display control of the rear display unit 101 and the intra-finder display unit 229. Processing in FIGS. 3A and 3B is executed by the digital camera 100 being powered on, and the system control unit 201 loading the program stored in the nonvolatile memory 256 into the system memory 252 so as to control each functional block. The processing in FIGS. 3A and 3B is started when the digital camera 100 is powered on.

In step S301 of FIG. 3A, the eye proximity detector 217 receives infrared light emitted from the light emitter and being reflected at the light receiver of the infrared proximity sensor, whereby detects a proximity of an object to the eyepiece unit 216.

In step S302, the system control unit 201 determines whether or not the proximity of the object is detected based on a detection result of the eye proximity detector 217 in step S301. In a case where the system control unit 201 determines that the proximity is detected, the system control unit 201 executes processing in step S304, and in a case where the system control unit 201 determines that the proximity is not detected, the system control unit 201 executes processing in step S303.

In step S303, the system control unit 201 sets the rear display unit 101 to the display state (sets on the display of the rear display unit 101), and sets the intra-finder display unit 229 to the non-display state.

In step S304, the system control unit 201 sets the rear display unit 101 to the non-display state.

In step S305, the system control unit 201 determines whether or not the line-of-sight input function is enabled. In a case where the system control unit 201 determines that the line-of-sight input function is enabled, the system control unit 201 executes processing in step S307, and in a case where the system control unit 201 determines that the line-of-sight input function is not enabled, the system control unit 201 executes processing in step S306. The enablement and disablement of the line-of-sight input can be set by the user using the menu button 114 in the menu screen.

In step S306, the system control unit 201 sets the intra-finder display unit 229 to the display state.

In step S307, in a case where the line of sight cannot be detected in line-of-sight detecting processing in later-described step S308, the system control unit 201 initializes a timer that counts a time while the line-of-sight detecting processing is repeated, and starts counting.

In step S308, the system control unit 201 performs the line-of-sight detecting processing.

FIG. 3B is a flowchart illustrating in detail the line-of-sight detecting processing in step S308. In step S3001, the system control unit 201 sets the line-of-sight detector 260 to a detectable state. The system control unit 201 causes the infrared light emitting element 266 to emit infrared light toward the eyepiece unit 216 and drives the line-of-sight detecting sensor 264 to enable it to detect infrared light. Thereby, the infrared light from the infrared light emitting element 266 reaches the user's eyeball via the eyepiece unit 216, and further, the infrared light reflected by the user's eyeball reaches the line-of-sight detecting sensor 264 via the eyepiece unit 216.

Referring now to FIG. 4A, a description will be given of the P images and the pupil edge. FIG. 4A illustrates one example of an eyeball image of a person onto which infrared light is projected. On the eyeball onto which the infrared light is projected, a plurality of bright spots called P images 161_b_ appear as reflected images. FIG. 4A illustrates two bright spots as an example, however, the number of P images 161_b_ corresponds to the number of the infrared light emitting element(s) 266. The pupil 161_a_ is a center portion of the iris, and an edge of the pupil 161_a_ can be detected from the luminance difference.

In step S3002, the system control unit 201 acquires a pupil image of the user through the line-of-sight detecting sensor 264, and outputs the acquired image to the line-of-sight detecting circuit 265.

In step S3003, the system control unit 201 acquires the edge of the user's pupil 161_a_ through the line-of-sight detecting circuit 265.

In step S3004, the system control unit 201 acquires the user's P images 161_b_ through the line-of-sight detecting circuit 265. The P images 161_b_ are bright spots each within a predetermined size and predetermined luminance range. Accordingly, even if a bright spot that is outside the predetermined size or the predetermined luminance range is present, such a bright spot is not regarded as the P image.

In step S3005, the system control unit 201 calculates a center position of the pupil 161_a_ from the edge of the pupil 161_a_, and calculates a line-of-sight gaze position from the relationship between the center position of the pupil 161_a_ and the P images 161_b_, as well as an interval between the P images 161_b_. Accordingly, in a case where the edge of the pupil 161_a_ cannot be detected, or only one or less number of the P image 161_b_ can be detected, the line-of-sight gaze position cannot be calculated. When the processing of step S3005 is finished, the system control unit 201 finishes the line-of-sight detecting processing and executes processing in step S309.

In step S309, the system control unit 201 determines whether or not the line of sight is detected by the line-of-sight detector 260 in step S308. In a case where the system control unit 201 determines that the line of sight is detected, the system control unit 201 executes processing in step S310, and in a case where the system control unit 201 determines that the line of sight is not detected, the system control unit 201 executes processing in step S312. Whether or not the line of sight is detected is determined based on whether or not the edge of the pupil 161*a* and the P images 161*b* are detected, and the line-of-sight gaze position is calculated in step S3005 of FIG. 3B.

In step S310, the system control unit 201 performs various settings changes based on the line-of-sight gaze position detected by the line-of-sight detector 260. For example, a target of the various settings changes are various settings changes in imaging conditions, such as changing a position of a line-of-sight pointer so that the line-of-sight gaze position can be visually recognized by the user, changing a focus adjustment position so that the lens is focused on the line-of-sight gaze position, and the like.

In step S311, the system control unit 201 sets a rate at which the line-of-sight detector 260 is operated from the next time (operation rate) to the first operation rate.

In step S312, the system control unit 201 determines whether or not a predetermined time has lapsed in the timer that had started counting in step S307. In a case where the system control unit 201 determines that the predetermined time has lapsed in the timer, the system control unit 201 executes processing in step S313, and in a case where the system control unit 201 determines that the predetermined time has not lapsed in the timer, the system control unit 201 executes processing in step S308. In a case where the line of sight cannot be temporarily detected due to a blink when the eyeball image is acquired, or the like, the line-of-sight detecting processing may be executed again. The predetermined time may be set to a relatively short period of time assuming a case where the line of sight cannot be temporarily detected. The determination of the system control unit 201 is based on the predetermined period of time in the above description, however, the determination may be based on a predetermined number of times.

In step S313, the system control unit 201 sets the rate at which the line-of-sight detector 260 is operated from the next time to the second operation rate. For example, by setting the second operation rate slower than the first operation rate, in a case where the user is closing his eye for a long period of time, an electric power consumption due to the operation of the line-of-sight detector 260 while the eye is closed can be reduced. By not causing the line-of-sight detector 260 to completely stop, the line-of-sight information can be detected when the user opens his eye again.

In step S314, the system control unit 201 executes an intra-finder display-off prohibition determination processing (determination processing of whether or not to prohibit the intra-finder display unit 229 from being set to the non-display state). In other words, in the present embodiment, the system control unit 201 functions as a determination unit.

In step S315, the system control unit 201 determines whether or not an intra-finder display-off is prohibited (the intra-finder display unit 229 is prohibited from being set to the non-display state), in step S314. In a case where the system control unit 201 determines that the intra-finder display-off is prohibited, the system control unit 201 executes processing in step S316, and in a case where the system control unit 201 determines that the intra-finder display-off is not prohibited, the system control unit 201 executes processing in step S317.

In step S316, the system control unit 201 sets the intra-finder display unit 229 to the display state.

In step S317, the system control unit 201 sets the intra-finder display unit 229 to an emergency state.

In step S318, the system control unit 201 determines whether or not the power switch 106 has been turned off by the user. In a case where the power switch 106 is continuously turned on, the system control unit 201 executes processing in step S301, and in a case where the power switch 106 is turned off, this flow ends.

Figure 5:
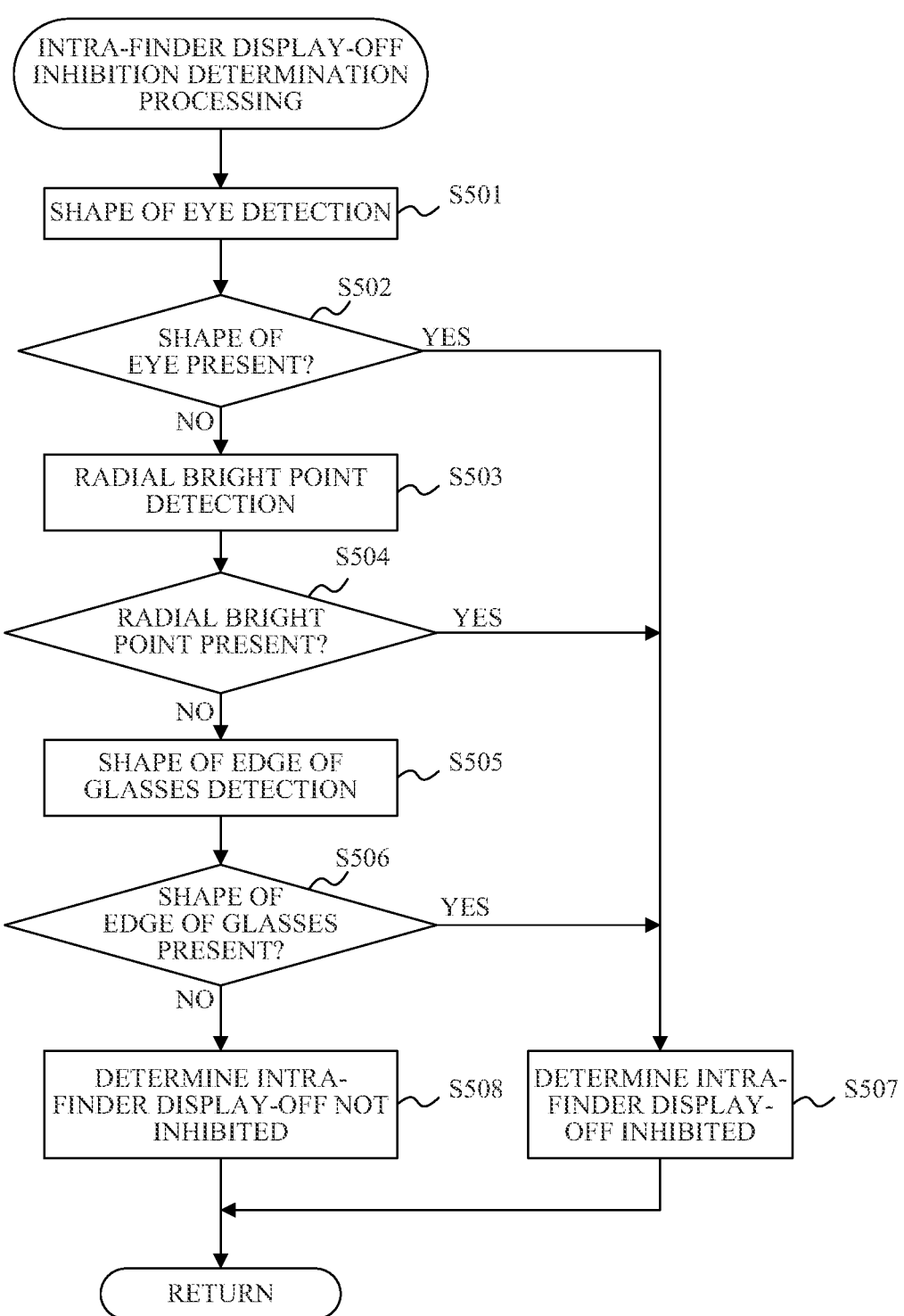
FIG. 5 is a flowchart illustrating an intra-finder display-off prohibition determination processing.

FIG. 5 is a flowchart illustrating the intra-finder display-off prohibition determination processing.

In step S501, the system control unit 201 detects an area having a shape of a person's eye in the eyeball image based on a feature in the eyeball image acquired by the line-of-sight detector 260. Referring now to FIGS. 4A to 4C, a description will be given of the area having the shape of the person's eye. FIG. 4A illustrates an eyeball image in a state where a naked-eye person opens his eyelid. FIG. 4B illustrates an eyeball image in a state where a person wearing a contact lens opens his eyelid. FIG. 4C illustrates an eyeball image in a state where a person closes his eyelid. In FIG. 4A, since two P images 161*b* and the edge of the pupil 161*a* can be detected, as described earlier in the flowchart of FIG. 3B, the user's line-of-sight gaze position can be calculated. In FIG. 4B, in a case where the contact lens is shifted, although the edge of the pupil 161*a* can be detected, there is a possibility that a portion of the P images 161*b* and an edge of the contact lens overlap each other and the P images 161*b* disappear, whereby the portion of the P images 161*b* cannot be detected. In FIG. 4B, only one P image 161*b* is detected. In a state where the person's eyelid is closed as illustrated in FIG. 4C, since the pupil 161*a* is not detected and an infrared light reflection at the cornea does not occur, the P images are not detected either. Accordingly, in the cases of FIGS. 4B and 4C, it is impossible to calculate the line-of-sight gaze position.

The system control unit 201 detects a shape of an open-state eyelid, an eyelash, a pupil, an iris, and the like, in the eyeball images of FIGS. 4A and 4B as an area having a shape of a person's eye. The system control unit 201 detects a shape of a closed-state eyelid, an eyelash, and the like, in the eyeball image of FIG. 4C as the area having the shape of the person's eye. As a detection method of these areas, a general pattern recognition method can be applied. For example, the following method may be cited. That is, a correct answer of shapes of the open-state and closed-state eyelids, the pupil, the iris, the eyelash, and the like, is given to data set of a large number of images of person's eyes in advance, and a computer, or the like, provided externally from the digital camera 100 is made to learn the correct answer so as to produce dictionary data. Then, the produced dictionary data is held in the nonvolatile memory 256, and the system control unit 201 is made to refer to the dictionary data.

In step S502, the system control unit 201 determines whether or not the area having the shape of the person's eye is present in the eyeball image, based on the detection result in step S501. In a case where the system control unit 201 determines that the area having the shape of the person's eye is present, the system control unit 201 executes processing in step S507, and in a case where the system control unit 201 determines that the area having the shape of the person's eye is not present, the system control unit 201 executes processing in step S503. In order to prevent an erroneous determination, for example, if in an open-eye state, it may be determined that the area having the shape of the person's eye is present in a case where not only the pupil but also a plurality of portions such as the pupil, the iris, the open-state eyelid, and the like, are detected.

In step S503, the system control unit 201 detects a radial bright spot in the eyeball image, based on the feature in the eyeball image acquired by the line-of-sight detector 260.

Figures 4G, 4H, 4I, 4J:
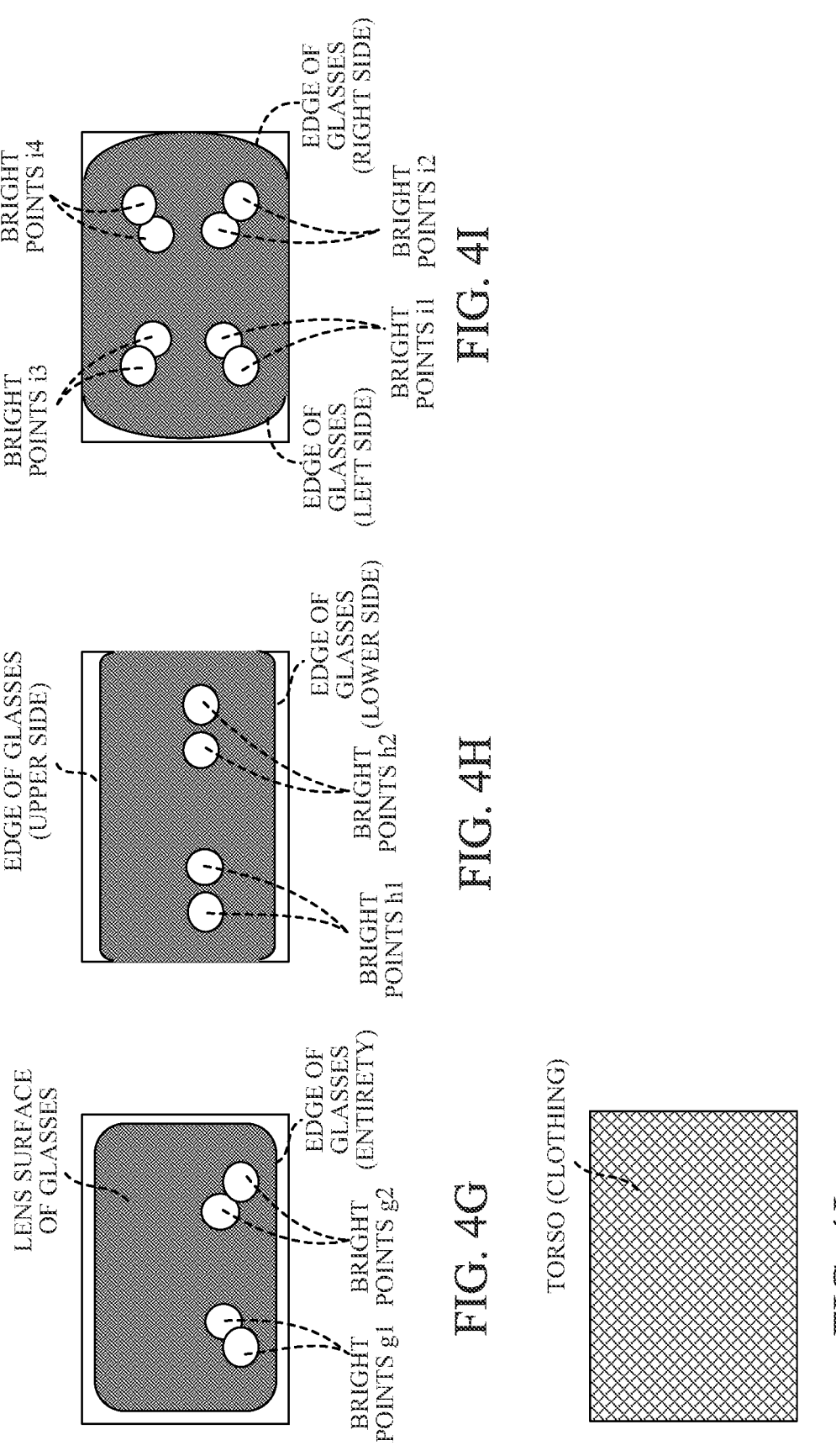

Referring now to FIGS. 4D to 4I, a description will be given of the radial bright spot. FIGS. 4D to 4F illustrate eyeball images of a person wearing translucent or light-colored glasses or sunglasses. FIGS. 4G to 4I illustrate eyeball images of a person wearing dark-colored glasses or sunglasses. FIGS. 4D to 4F correspond to FIGS. 4G to 4I, respectively, and they are eyeball images acquired in a state where only the darkness of the glasses or sunglasses is different.

In FIG. 4D, bright spots d1, d2 are observed as bright spots different from the P images. In FIG. 4E, bright spots e1, e2 are observed as bright spots different from the P images. In FIG. 4F, bright spots f1, f2, f3, f4 are observed as bright spots different from the P images. In FIG. 4G, bright spots g1, g2 are observed as bright spots different from the P images. In FIG. 4H, bright spots h1, h2 are observed as bright spots different from the P images. In FIG. 4I, bright spots i1, i2, i3, i4 are observed as bright spots different from the P images.

In FIG. 4D, since two P images are detected as well as the edge of the pupil, the line-of-sight gaze position can be calculated. In FIG. 4F, since four P images are detected as well as the edge of the pupil, the line-of-sight gaze position can be calculated. In FIG. 4E, although a portion of the edge of the pupil has disappeared due to the bright spot e2, however, since the majority of the portion of the edge of the pupil is observed, the edge of the pupil can be detected. However, a portion of the P images has disappeared due to the bright spot e2 and since only one P image is detected, the line-of-sight gaze position cannot be calculated. In FIGS. 4G to 4I, since the P images and the edge of the pupil are not detected, the line-of-sight gaze position cannot be calculated.

The bright spots different from the P images observed in FIGS. 4D to 4I are the infrared light projected from the infrared light emitting element 266 being reflected by a lens surface on a front side (a side farther from the eyes) of the glasses, and a lens surface on a rear side (a side closer to the eyes) of the glasses. Since the lens surface of the glasses or sunglasses has a closer distance to the infrared light emitting element 266 than the person's eye, the bright spots have a feature of being larger than the P images. The number of the bright spots that occur depends on the number of the infrared light emitting elements 266. As described earlier, since the bright spots are reflected images of the infrared light at the lens surface on the front side and the lens surface on the rear side of the glasses, two bright spots occur for one infrared light emitting element 266. In other words, in FIGS. 4D, 4E, 4G, and 4H, two infrared light emitting elements 266 are used. In FIGS. 4F and 4I, four infrared light emitting elements 266 are used. Since the infrared light emitting element 266 emits the infrared light toward near the center of the eyepiece unit 216, the bright spots are formed along a radiation direction with respect to the center portion of the eyeball image from a disposed position of the infrared light emitting element 266. In FIGS. 4D and 4G, since the infrared light is emitted from a lower right direction and a lower left direction with respect to the eyeball, the bright spots d1, d2 (or the bright spots g1, g2) are formed along the radiation direction on the lower left and the lower right with respect to the center portion of the eyeball image. In FIGS. 4E and 4H, since the infrared light is emitted from left and right directions with respect to the eyeball, the bright spots e1, e2 (or the bright spots h1, h2) are formed along the radiation direction on the left and right with respect to the center portion of the eyeball image. In FIGS. 4F and 4I, since the infrared light is emitted from the lower left, the lower right, an upper left, and an upper right directions with respect to the eyeball, the bright spots f1, f2, f3, f4 (or the bright spots i1, i2, i3, i4) are formed along the radiation direction on the lower left, the lower right, the upper left, and the upper right with respect to the center portion of the eyeball image. In this manner, since the number of the bright spots and the radiation direction in which the bright spots are formed depend on the configuration of the digital camera 100, the system control unit 201 determines whether or not the bright spots of a predetermined number or in a direction is present, based on the configuration of the digital camera 100. Since there may be cases where light that has entered externally of the digital camera 100 to the eyepiece unit 216 is also formed as bright spots, the number of observed bright spots is not necessarily a certain number, and may change depending on the circumstances.

In step S504, the system control unit 201 determines whether or not the radial bright spot is present in the eyeball image, based on the detection result in step S503. In a case where the system control unit 201 determines that the radial bright spot is present, the system control unit 201 executes processing in step S507, and in a case where the system control unit 201 determines that the radial bright spot is not present, the system control unit 201 executes processing in step S505.

In step S505, the system control unit 201 detects a shape of an edge (frame) of the glasses or sunglasses in the eyeball image, based on the feature in the eyeball image acquired by the line-of-sight detector 260.

Referring now to FIGS. 4D to 4I, a description will be given of the shape of the edge of the glasses or sunglasses. In FIGS. 4D and 4G, an entire edge of the glasses or sunglasses is observed. In FIGS. 4E and 4H, only upper and lower edges of the glasses or sunglasses are observed. In FIGS. 4F and 4I, only left and right edges of the glasses or sunglasses are observed. An observation result depends on a size of the wearing glasses or sunglasses, a field angle of the eyeball image to be captured, and the like. Although not illustrated, there may be cases where only an upper side, lower side, left side, or right side of the edge is observed in the eyeball image.

The system control unit 201 determines whether or not the shape of the edge of the glasses or sunglasses is present based on whether or not an area formed by a line with a continuous predetermined thickness can be detected. The shape may be linear as illustrated in FIGS. 4D, 4E, 4G, and 4H, or may be rounded as illustrated in FIGS. 4F and 4I. In a case where an eye area can also be observed in the eyeball image as illustrated in FIGS. 4D, 4E, and 4F, the shape may be detected by only on the outer side of the eye area. In a case where the user is wearing dark-colored glasses or sunglasses as illustrated in FIGS. 4G, 4H, and 4I, the inner side portion where the lens is present in the eyeball image has a feature that a brightness is lower than that in the outer side portion where the lens is not present. Accordingly, a brightness difference between the inner side area and the outer side area may be used.

In step S506, the system control unit 201 determines whether or not the shape of the edge of the glasses or sunglasses is present in the eyeball image based on the detection result in step S505. In a case where the system control unit 201 determines that the shape of the edge of the glasses or sunglasses is present, the system control unit 201 executes processing in step S507, and in a case where the system control unit 201 determines that the shape of the glasses or sunglasses is not present, the system control unit 201 executes processing in step S508. In a case where the user is wearing glasses without an edge or with a large size that exceeds the field angle of the eyeball image, or the like, the edge of the glasses may not be detected in step S505. In such a case, a wearing state of the glasses or sunglasses can be determined by detecting the radial bright spots in step S503.

In step S507, the system control unit 201 determines that the intra-finder display-off is prohibited.

In step S508, the system control unit 201 determines that the intra-finder display-off is not prohibited.

FIG. 4J illustrates an eyeball image in a case where the digital camera 100 is suspended by a strap from the person's neck, and the person's torso (for example, worn clothing) is closely attached to the eyepiece unit 216. In FIG. 4J, since neither the P images nor the edge of the pupil is observed, the line-of-sight gaze position cannot be calculated. The area having the shape of the person's eye such as the eyelid, iris, or the like, the radial bright spots, the area having the shape of the edge of the glasses or sunglasses are also not present.

In the present embodiment, in the flowchart of FIG. 5, all three processings in step S502, step S504, and step S506 are executed, however, the all three processings do not necessarily have to be executed. By combining the processings in step S504 and step S506, it may be determined that the intra-finder display-off is prohibited, only in a case where both of the radial bright spots and the shape of the edge of the glasses are present.

As described above, according to the configuration of the present embodiment, it is determined whether or not the intra-finder display unit 229 is set to the non-display state, and the display of the intra-finder display unit 229 is controlled, in a case where the object approaches the eyepiece unit 216 and the line-of-sight information is not detected. Accordingly, in a case where the user suspends the digital camera 100 from his neck by the strap, or the like, the intra-finder display unit 229 is set to the non-display state, whereby the consumption of unnecessary electric power can be suppressed. Even in a case where the line-of-sight information cannot be normally detected due to the user wearing the sunglasses, or the like, the intra-finder display unit 229 is set to the display state, based on the detection of the shape of the eye, the radial bright spots, the shape of the edge of the glasses, or the like, whereby it is possible to display appropriate information.

Various above controls performed by the system control unit 201 may be performed by single hardware, or may be performed by multiple hardware through shared processing to control the entire apparatus.

The present embodiment is described exemplifying a case where the present disclosure is applied to the digital camera 100, however, the present disclosure is not limited thereto, and is applicable to an apparatus with an eye-proximity detecting function and the line-of-sight input function. In other words, the present disclosure is applicable to a personal computer, a PDA (personal digital assistant such as a mobile phone terminal or the like), a portable image viewer, a printer device with a display, a digital photo frame, a music player, a game console, or other devices. The present disclosure is further applicable to an electronic book reader, a tablet terminal, a smartphone, a projection device, a home appliance equipped with a display, an in-vehicle device, or other devices.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide an image pickup apparatus capable of properly controlling display of an intra-finder display unit.

This application claims the benefit of priority from Japanese Patent Application No. 2023-007473, filed on Jan. 20, 2023, which is hereby incorporated by reference herein in its entirety.

What is claimed is:

1. An image pickup apparatus comprising:
a line-of-sight detector configured to acquire an eyeball image of a user who peers through the viewfinder to detect a line-of-sight of the user gazing at in a display unit disposed inside the viewfinder based on the eyeball image; and
a processor configured to
perform a first determination process to determine whether or not the line-of-sight is detected by the line-of-sight detector,
perform a second determination process to determine whether or not to prohibit setting the display unit to a non-display state based on whether a radial bright spot is present in an eyeball range, and an edge area of glasses or sunglasses, which is an area formed by a line with a predetermined thickness, is present in the eyeball image, after the first determination process, in a case where the line of sight is not detected in the first determination process,
determine to prohibit setting the display unit to the non-display state, in a case where the radial bright spot is present in the second determination process, and the edge area of the glasses or sunglasses is present in the second determination process, and control the display unit not set to the non-display state according to a determination to prohibit setting the display unit to the non-display state by the second determination process.

2. The image pickup apparatus according to claim 1, wherein in the case where the line-of-sight information is not detected and in a case where the processor determines that the display unit is not prohibited from being set to the non-display state, the processor sets the display unit to the non-display state.

3. The image pickup apparatus according to claim 1, wherein in a case where the processor determines that an area having a shape of a human eye exists in the eyeball image, the processor determines that the display unit is prohibited from being set to the non-display state.

4. The image pickup apparatus according to claim 3, wherein in a case where at least one of areas having shapes of an eyelid in an open state, an eyelid in a closed state, an eyelash, an iris, and a pupil exists in the eyeball image, the processor determines that the area having the shape of the human eye exists.

5. The image pickup apparatus according to claim 1, wherein the processor sets an operation rate of the line-of-sight detector to a first operation rate in a case where the line-of-sight information is detected, and sets the operation rate of the line-of-sight detector to a second operation rate lower than the first operation rate in the case where the line-of-sight information is not detected.

* * * * *